Nov. 17, 1964

R. FOX 3,157,802

THERMIONIC ENERGY CONVERTER

Filed Sept. 21, 1960

INVENTOR.
RAYMOND FOX
BY
*Roland A. Anderson*
ATTORNEY

_United States Patent Office_

3,157,802
Patented Nov. 17, 1964

3,157,802
THERMIONIC ENERGY CONVERTER
Raymond Fox, Oakland, Calif., assignor to the United States of America as represented by the United States Atomic Energy Commission
Filed Sept. 21, 1960, Ser. No. 57,595
6 Claims. (Cl. 310—4)

The present invention relates to thermionic energy converters and is particularly directed to a novel method of increasing the efficiency of thermionic energy conversion to facilitate practical application of such conversion in many industrial and scientific fields.

Many industrial and scientific groups are presently engaged in the design and development of devices and methods for converting heat directly to electricity. Besides their obvious utilization in electrical power generation, such conversion methods may be particularly adapted to the field of space travel. However, until the present time no practical thermionic converters have been developed with high enough efficiencies to permit their practical application. That is, most prior art converters are being used as laboratory equipment for testing the theory of operation thereof. The few converters that have practical efficiencies are very complicated in structure and theory, and are therefore relatively undesirable in industry and science.

The method of the present invention, on the other hand, increases the efficiency of a diode converter to practical values in a relatively simple manner. Basically, such method consists of the addition of barium vapor to the cesium vapor within a conventional diode converter, whereby such addition presents certain advantages including a manifest increase in the conversion efficiency thereof.

Therefore, it is an object of the present invention to provide an improved method of converting heat to electricity with an attendant efficiency heretofore unattainable.

It is another object of the present invention to provide an improved system for converting nuclear reactor heat to electricity directly and simply, at temperatures in the region of 2000° C.

A further object of the present invention is to provide a method for improving the operation of a power diode converter by directly eliminating space charge effects and optimizing cathode and anode work function relationships therein.

Still another object of the present invention is to provide an improved plasma diode heat converter wherein the cathode work function is depressed to an optimum value by an element that has a high activation energy for the cathode material.

Additional objects and advantages of the present invention will become apparent by referring to the following specification and claims taken in conjunction with the accompanying drawing of which:

Figure 1:
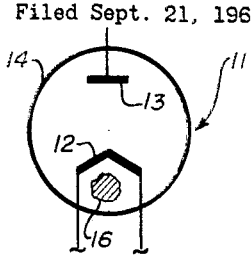
FIGURE 1 is a simplified schematic view of a conventional thermionic diode converter.

Referring now to the drawing and to FIGURE 1 in particular there is shown in simplified configuration a conventional thermionic diode converter 11, comprising in general a cathode electrode 12 from which electrons are thermionically emitted, and an anode electrode 13 disposed spatially opposite the cathode 12 to collect such emitted electrons. Both the cathode and anode are mounted within a sealed envelope 14, preferably of glass. The cathode 12 necessarily has a high work function electron emitting surface relative to the preferably low work function electron collecting surface of the anode 13, as taught by the literature.

As is known in the art, operating the high work function cathode 12 at a temperature hotter than the temperature of the relatively lower work function anode 13 results in increasing the number of higher energy electrons in the former than in the latter. Thus, electrons will flow from the cathode 12 to the anode 13 within the diode 11. If an exterior load circuit is connected between the cathode and anode such electron flow will give rise to a current flow in the load circuit, resulting in a useful electrical output.

Three very basic operational parameters must be met for proper functioning of any thermionic energy converter. First, the anode must have as low a work function surface as possible relative to an optimum cathode work function surface; second, the cathode should be operated at as high a temperature as possible relative to the anode; and third, the space charge effect must be neutralized or prevented.

In one example of conventional diode converters the necessary difference in cathode and anode work functions and the problem of space charge effects are resolved by constructing both electrodes of one material such as tungsten or thiorium carbide. Then, positive ions are added to the interelectrode space to provide for space charge neutralization. In one type of conventional diode converter these positive ions are introduced in the form of cesium vapor sealed within the envelope. The cesium vapor preferably is created by vaporizing a piece of metallic cesium within the envelope by introducing heat thereto, such heat as that produced by an electric current. The vapor serves three purposes. First, it provides an ion source for space charge neutralization. Second, cesium coats the anode material with a monatomic layer of cesium atoms thereby providing a coverage which reduces the anode work function to a value approximately that of cesium itself. Thus the anode and cathode can be made of the same material but still have different work function surfaces. Third, a partial coating of cesium forms on the cathode reducing its work function sufficiently to create high electron emission at a moderate cathode temperature. This partial coating gives the cathode an optimum value of work function and permits maximum cathode efficiency. Unfortunately, temperature, and to a lesser extent pressure, limits the fraction of coating deposited by cesium. This limited fraction of coating makes it difficult to obtain the optimum cathode work function at elevated operating temperatures thus limiting the over all efficiency of the diode converter.

When using only cesium vapor the necessity for high pressures in order to achieve any degree of converter efficiency gives rise to a problem of electron scattering and oscillations where such scattering causes a reduction of converter efficiency. That is, at temperatures above approximately 300° C. an increase of pressure is necessary to obtain a partial cathode coating of cesium to provide the optimum cathode work function surface of previous mention. The increased pressure in turn increases electron scattering which is not desirable. Thus, various techniques are necessary to overcome the scattering and resulting oscillations, such as using an accelerating field for electron control. Such techniques generally result in a complicated diode structure and related theory of operation.

As previously mentioned, the method of the present invention overcomes the above shortcomings of conventional converters and consists simply of the addition of barium vapor to the cesium vapor used in the conventional diode converter as shown in FIGURE 1. The barium vapor is introduced within the converter envelope 14 in the same manner as is the cesium vapor in the conventional thermionic diode of previous mention. This is exemplified by numeral 16 whereby is depicted the addition of metallic barium within the envelope 14 for producing by vaporization thereof, the barium vapor therein in accordance with the present invention. More specifically, the cesium vapor is first introduced. The cesium reservoir is sealed off and the barium vapor is introduced by heating up the tube in the conventional manner. The cesium vapor provides the usual space charge neutralizing effects and the monolayer on the anode for low anode work function. The barium provides the important advantages of a cathode fractional monolayer with a stable low work function, a relatively wider range of cathode operating temperatures and a relatively lower diode pressure.

For example, with higher cathode operating temperatures (above 800° C.) barium, unlike cesium, will form a stable low work function monolayer on the cathode without the need for a substantial increase in diode pressure. Therefore there is no high pressure to cause electron scattering and such scattering is eliminated directly and simply. This is true for even very high temperature application in the region of 2400° C. as experienced in applications with nuclear reactors for space travel.

Another problem well known in the art is eliminated by the addition of barium vapor as taught by the present invention. Such problem is that of spacing large area electrodes exceedingly close together (e.g., ½ mil) to help prevent electron scattering and space charge effects. However, electrode spacings of 10 mils or greater are permissible in a diode converter utilizing the cesium plus barium additive in accordance with the present invention. Construction and maintenance of such a 10 mil electrode spacing is well within engineering capabilities.

The advantages mentioned above which stem from the addition of cesium plus barium allow a converter efficiency of approximately 50%. The prior art converter in comparison has a maximum efficiency on the order of 30%.

Figure 2:
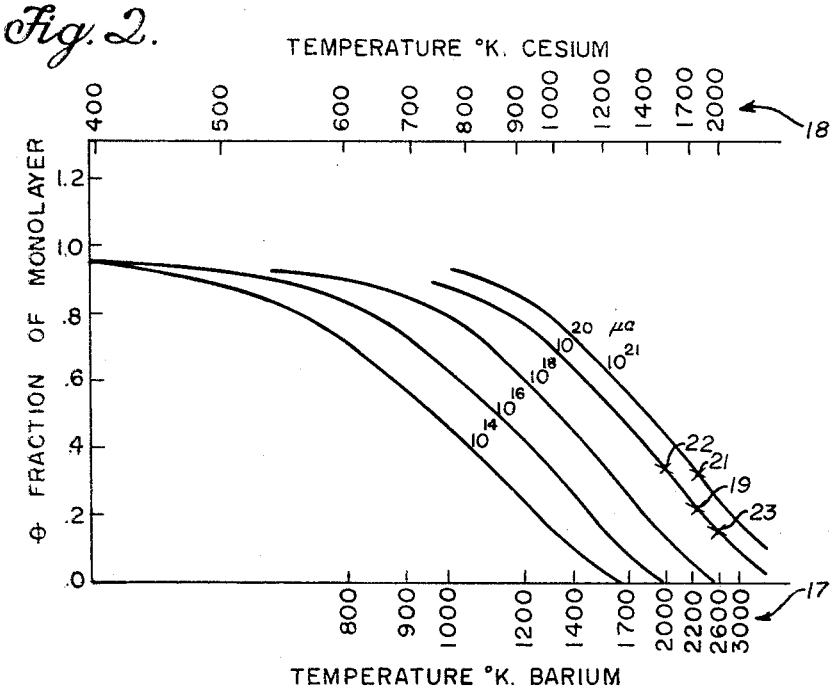
FIGURE 2 is a graph comparing the relative effects of barium and cesium vapor with respect to temperatures versus fraction of monolayer for various atom current densities.

The advantages set forth in accordance with the present invention are further explained by referring now to FIGURE 2 wherein a graph shows the relationship between the atom current densities, $\mu_a$, and fraction of monolayer covering, $\theta$, versus cesium and barium temperatures. Atom current density, $\mu_a$, is directly proportional to diode pressures for different temperatures of cesium and barium, therefore the terms "$\mu_a$" and "pressure" are used interchangeably in the ensuing explanation.

The scale 17 for barium temperature as shown in FIGURE 2 is found by multiplying the cesium scale 18 of temperatures by the ratio of the activation energies of barium and cesium on tungsten. The activation energy of barium on tungsten is 85 kcal./mole and of cesium on tungsten is 65 kcal./mole. Thus the barium temperature scale is displaced upwardly from the cesium scale by a factor of 1.3. For a particular value of $\mu_a$ and $\theta$ (point 19), barium in a converter hence allows operation thereof at higher temperatures than does cesium, as shown by referring to scales 17 and 18, respectively. That is, barium facilitates cathode operation at a temperature of 2300° K. whereas cesium facilitates operation at a temperature of only 1750° K. The operation of the cathode at the higher temperature is an advantage when using a converter-reactor for space travel. The present invention allows the use of the converter directly in conjunction with the reactor at the cathode temperature of 2300° K. or higher. Furthermore, such is done in a direct, simple and lightweight manner with no need for added equipment to lower the reactor temperature before applying same to the cathode.

Given a value of temperature and fraction of monolayer covering, $\theta$ (for example, $T=2300°$ K. and $\theta=0.35$), the operating atom current density, $\mu_a$ (point 21) within the diode is much less using barium than when using cesium. $\mu_a$ in this case equals $10^{21}$ atoms cm.$^2$/sec. for barium. However, when using cesium the value of $\mu_a$ necessary for proper diode operation is completely off the graph and therefore not even feasible. As stressed before, having a lower pressure is desirable since it results in a decrease of electron scattering.

For a given value of temperature and $\mu_a$ (e.g., $T=2000°$ K. and $\mu_a=10^{20}$) there is a larger barium monolayer covering (point 22) than cesium covering (point 23). Such fact indicates that barium will provide a larger range of percentage of monolayer covering at higher temperatures. These higher temperatures, as previously mentioned, are of great interest in the reactor-converter program. That is, by using barium simultaneously with cesium, in accordance with the present invention, an optimum cathode work function can be obtained at a greater range of higher temperatures and at a relatively large atom current density, $\mu_a$, of about $10^{20}$ atoms/cm.$^2$ sec.

Figure 3:
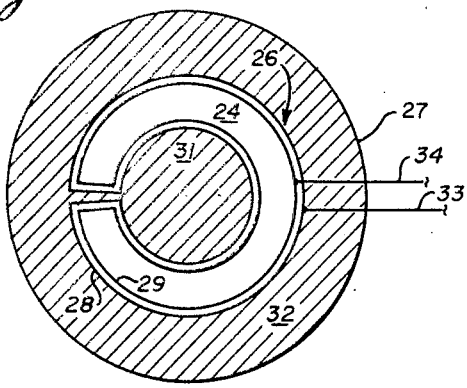
FIGURE 3 is a simplified cross-sectional view of an alternative embodiment of the present invention as utilized in combination with a nuclear reactor for space travel.

Referring now to FIGURE 3 there is shown an alternative embodiment of a diode converter utilizing the method of the present invention, and wherein such embodiment represents a preferred practical application therefor. A space charge neutralized converter is comprised essentially of two surfaces or electrodes and a low pressure vapor in the interelectrode volume therebetween. In the preferred use as depicted in FIGURE 3 a spherical geometry is employed in which a small, hot nuclear reactor 24 is concentrically encased by a converter 26. A radiator 27 is concentrically disposed about the converter 26. The converter 26 comprises in particular an anode 28 and a cathode 29 wherein the cathode 29 is connected to the fueled region of the reactor 24 and the anode 28 is connected to the radiator 27. The cathode will operate at a higher temperature than the anode as hereinbefore described, which means that the area of the radiator 27 must be greater than the area of the cathode 29. A moderator 31 can be placed inside the reactor 24 in the center of the combined spherical geometry and such moderator 31 is thermally connected with an outer moderator 32, the latter disposed between the radiator 27 and anode 28. Moderators 31 and 32 are used to regulate the operation of reactor 24 as is well known in the respective art. The transmission of energy from anode 28 to radiator 27 is most simply done by conduction and thus requires no moving parts. The conduction distance furthermore must be no greater than a few inches to prevent an excessive temperature drop between anode and radiator.

In operation as set forth in accordance with the present invention, the addition of barium makes possible such a straightforward configuration in the combination of a nuclear reactor and thermionic energy converter. As may be seen, no coolant loops or heat matching means are necessary to effect a match between the available reactor temperature and the relatively lower temperature normally employed for the optimum operation of the conventional thermionic converter. Conventional converters employing only cesium vapor operate far below the reactor temperature thus necessitating heat matching radiators or coolant loops. More specifically in accordance with the present invention, heat produced by the nuclear reactor 24 is directly applied to the surrounding cathode 29, while the anode 28 is maintained at a relatively cooler temperature, as herein set forth previously, by means of the connected surfaces of radiator 27. As is well known in the art of thermionic diodes the difference of temperatures and work function surfaces between the cathode 29 and anode 28 for the most part, results in an electron flow from the former to the latter. Terminal means for extracting the power available are provided by output lines 3 and 34 connected to the anode 28 and cathode 29 respectively.

The power given to the radiator 27 by way of the converter 26 may be varied by varying the cathode area of the converter. This is done, for example, by replacing the portion of unwanted cathode area by heat shielding material.

To provide a practical conversion system for use with a reactor in space travel the following comprise representative parameters:

$$T_c = 2600° \text{ K.}$$
$$T_a = 1600° \text{ K.}$$
$$\phi_c = 3.4$$
$$\phi'_a = 1.9$$
$$\epsilon' = 0.3$$
$$\epsilon_R = 0.9$$
$$Q = 0.2$$

where $T_c$ = cathode temperature
$T_a$ = anode temperature
$\phi_c$ = cathode work function
$\phi'_a$ = anode work function plus the voltage drop inside the converter
$\epsilon'$ = effective emissivity
$\epsilon_R$ = emissivity of the radiator $$Q = \sqrt{\frac{K \Delta T}{\sigma}}$$

where $\Delta T$ = cathode to anode temperature difference
$K$ = thermal conductivity of the connector
$\sigma$ = electrical conductivity of the connector.

While the invention has been disclosed herein with respect to a single preferred embodiment, it will be apparent that numerous variations and modifications may be made within the spirit and scope of the invention, and thus it is not intended to limit the invention except by the terms of the following claims.

What is claimed is:

1. In a method for improving the efficiency of a thermionic energy converter containing a cathode, an anode, and cesium vapor the steps comprising adding barium vapor to said cesium vapor within said converter, maintaining the cathode at a high temperature relative to the anode within said converter, and maintaining the pressure of said barium vapor within said converter at a value to create an optimum cathode work function for the cathode temperature maintained.

2. In a method for improving the efficiency of a thermionic energy converter containing a cathode, an anode and cesium vapor the steps comprising adding a barium vapor to said cesium vapor within said converter, maintaining the temperature of the cathode within the range from 300° C. to the melting point of the material of which the cathode is constructed, and maintaining the pressure of said barium vapor at a value to create an optimum cathode work function ranging between the limits of 4.5 to 2.5 volts.

3. In a method of improving the conversion of reactor heat into electricity within a thermionic diode energy converter including an anode, a cathode and cesium vapor the steps comprising adding barium vapor to said cesium vapor within said converter, applying the reactor heat to the cathode of said converter, cooling the anode to a substantially low temperature relative to said cathode, and maintaining the barium vapor at a pressure commensurate with the establishment of an optimum cathode work function for the cathode temperature maintained.

4. In the direct conversion of heat to electricity within a thermionic diode converter containing cesium vapor and a cathode spatially disposed opposite an anode, the steps comprising introducing barium vapor within the converter, maintaining said anode within the converter at a temperature conducive to the formation of a monatomic layer of cesium thereon, heating said cathode within the converter to a temperature substantially above that of the anode, maintaining a cesium vapor pressure within the converter relative to the temperature of said anode conducive to the neutralization of space charge of electron flow therein, and maintaining a barium vapor pressure within the converter to form a partial monatomic layer of barium on the cathode and provide an optimum cathode work function surface relative to the work function surface of the anode.

5. In a thermionic heat to electricity diode converter having a cathode and anode within an envelope, the improvement comprising a mixture of barium and cesium vapors disposed within said envelope and in the region between said anode and cathode, said barium vapor thereby serving to provide a stable optimum work function monolayer on said cathode said cesium vapor within the diode envelope.

6. In a heat conversion system including a nuclear reactor, a cathode electrode spatially disposed about said reactor, an anode electrode spatially disposed about said cathode to define an annular space therebetween, and radiator means connected to said anode to dissipate heat therefrom, the improvement comprising a mixture of barium and cesium vapors disposed within said annular space, said barium vapor thereby serving to provide a stable optimum work function monolayer on said cathode electrode said cesium vapor within said annular space.

References Cited by the Examiner

UNITED STATES PATENTS

| 2,115,147 | 4/38 | Marshall | 313—229 X |
| 2,510,397 | 6/50 | Hansell. | |
| 2,759,112 | 8/56 | Caldwell. | |
| 2,680,819 | 4/61 | Feaster | 310—4 X |

MILTON O. HIRSHFIELD, *Primary Examiner.*

ORIS L. RADER, *Examiner.*